Jan. 7, 1969     P. M. ERLANDSON     3,420,079
COLD PROJECTION WELDING, TACKING, SEVERING OR METAL FORMING
Filed April 26, 1966
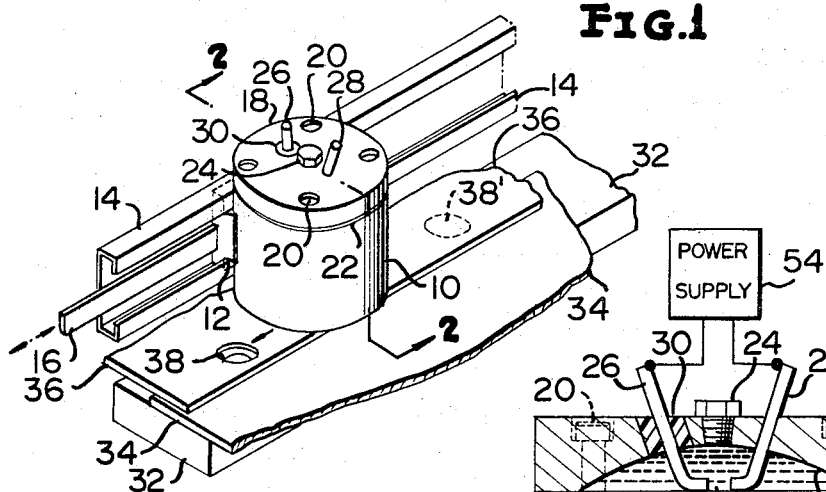
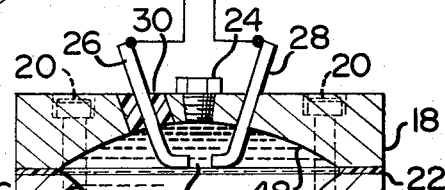
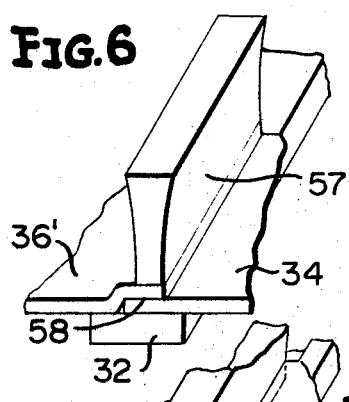
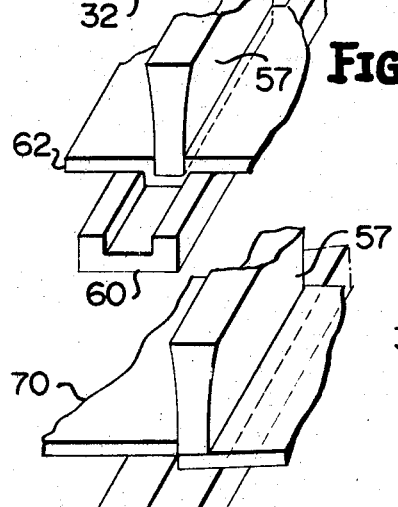
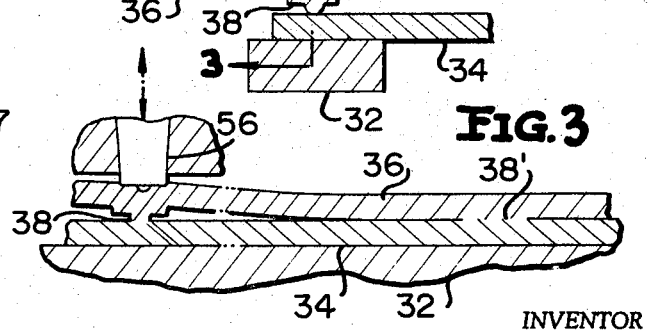
INVENTOR
PAUL M. ERLANDSON
BY *Mason, Porter, Diller & Brown*
ATTORNEYS

INVENTOR
PAUL M. ERLANDSON

United States Patent Office 3,420,079
Patented Jan. 7, 1969

3,420,079
COLD PROJECTION WELDING, TACKING, SEVERING OR METAL FORMING
Paul M. Erlandson, Palos Park, Ill., assignor to Continental Can Company, Inc., New York, N.Y., a corporation of New York
Filed Apr. 26, 1966, Ser. No. 545,283
U.S. Cl. 72—56          16 Claims
Int. Cl. B21j 5/04

ABSTRACT OF THE DISCLOSURE

Methods and apparatus for performing operations on metal strips and the like through the production of an electrical discharge within a fluid containing chamber are disclosed. An elastomeric plug seals a fluid containing chamber in which are disposed at least two spaced electrodes for producing an electrical discharge therebetween. The chamber is of a tapered configuration and the elastomeric plug is similarly tapered and extends along an axial extent of the chamber in contact with the walls thereof. Upon the occurrence of an electrical discharge a force is transmitted to the plug via the chamber fluid to effect outward extension of the plug into contact with a workpiece.

---

This invention relates to a method and apparatus for performing operations on metal strips, blanks, and the like through the application of electrical energy to at least two fluid immersed electrodes which support a spark discharge between electrode pairs and transmit the force so generated through the fluid to actuate an elastomeric member. The invention is particularly useful in the field of welding, tacking, severing, flanging, embossing, conforming, etc.

In the container industry, thin sections or blanks of metal are joined, severed, embossed, etc. in various operations so as to fabricate a finished container. If container bodies are to be formed from blanks, the initial step in the formation of the container body may be to wrap the blank about a horn. Next, the opposing edges of the newly formed tubular member are joined to result in a closed structure. Known methods for joining the opposing edges may be mechanical through the formation of a hook, by soldering or welding, gluing, etc. In addition, combinations of these methods may be employed, for example, where a double hook is formed mechanically and subsequently soldered along the seam.

Recently, the welding of the opposing edges of a strip or blank to result in a side seam has achieved commercial use. One method of welding the strip or blank is by electrical resistance spot welding. There are many practical difficulties involved in development of a high speed, high reliability spot welding machine, one of which is the achievement of suitable forging means to urge the two edges of a blank together.

In resistance welding, the opposing edges of the tubular member must be placed in an overlapping relationship to one another, tacked together to maintain proper relationship therebetween and subjected to welding for effecting a gas-tight seam. However, pin holes may result at the points of tacking thus producing a leaky container. Gas type welding is likewise uneconomical due to its speed of operation, thinness of the material to be welded, maintaining proper welding temperatures, etc.

Accordingly, it becomes desirable to devise a method and apparatus for rapidly and efficiently performing operations, such as welding, to form container bodies and the like. This is achieved by the present invention by providing a fluid filled chember in which at least one pair of electrodes is positioned. One end of the chamber is closed by a resilient plug which may project or may be projected during the operation, externally from a block in which the chamber is formed. Through the application of a suitable source of electrical energy through the electrodes, the electrical energy is transformed into mechanical work by the actuation of the resilient or elastomeric member.

Accordingly, it is the principal object of the present invention to improve cold welding methods and apparatus for embossing, reforming, severing, etc. container bodies, ends, blanks and other thin gage materials.

It is another object of the present invention to provide a method and apparatus for converting electrical energy into mechanical work which is efficient, rapid, easily controlled, and requires little maintenance.

It is a further object of the present invention to provide a method and apparatus for converting electrical energy into mechanical work which may be applied to cold weld, emboss, reform, sever, etc., containing bodies, ends, blanks and the like.

It is a still further object of the present invention to provide a cold welding apparatus which employs the energy created by a plasma bubble formed in one or more spark gaps to produce a fluid displacement to thereby actuate an elastomeric member capable of joining materials to form a weld joint or seam.

The invention both as to its organization and method of operation together with further objects and advantages thereof will best be understood by reference to the following specification taken in conjunction with the accompanying drawings, in which:

FIGURE 1 is a perspective view of one form of the invention illustrating the housing of the apparatus supported by a track and movable with respect to a pair of edges to be welded;

FIGURE 2 is a sectional view of the apparatus and clearly showing the chamber, one pair of electrodes immersed in the fluid within the chamber, and the resilient "hammer" actuated by a spark discharge between the electrodes of said pair and communicated through the fluid;

FIGURE 3 is a sectional view taken along the line 3—3 of the FIGURE 2 and illustrating a series of welds being progressively formed along a pair of edges to be joined;

FIGURE 6 illustrates a pair of edges being conformed, one to the other so that a smooth, almost continuous panel is developed—outside for decorative purposes or inside for reduction of the cut edge surface and improved protection of the contents;

FIGURE 7 shows the metal forming capabilities of the invention wherein a channel-shaped die is positioned under the elastomeric member so that the metal is formed in accordance with the die; and FIGURE 8 illustrates the shearing or severing capabilities of the invention wherein a section of material is positioned over a shearing edge die.

Figure 4:
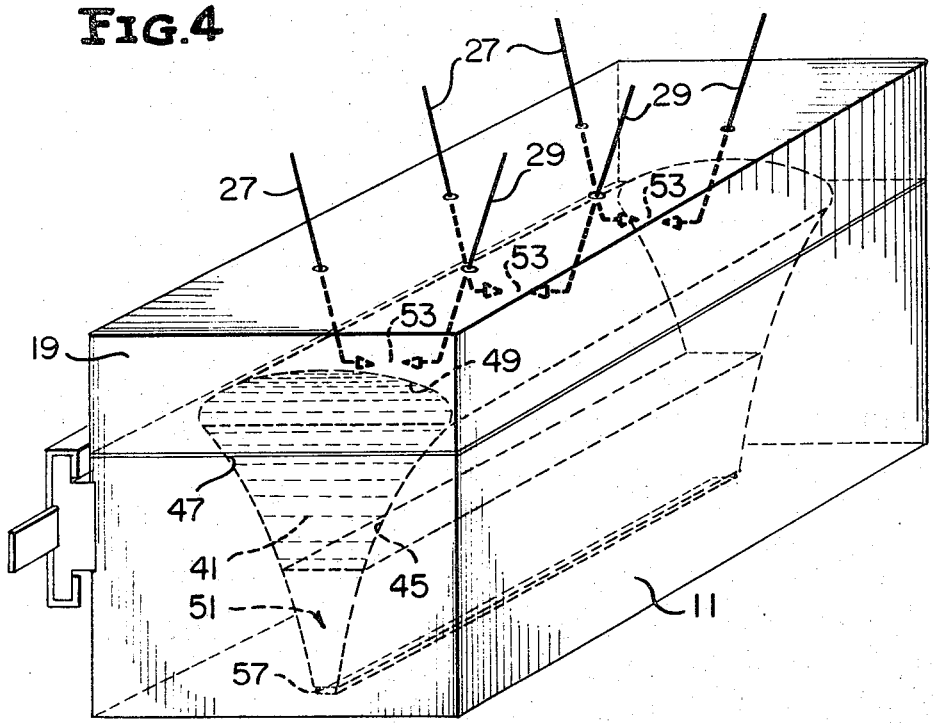
FIGURE 4 is a perspective view of another form of this invention, showing the housing of the apparatus having a chamber equipped with a plurality of pairs of electrodes.

The perspective view of the FIGURE 1 illustrates a housing 10 of the apparatus having a channel bracket 12 secured approximately midway on its periphery. The channel bracket 12 is adapted to be reciprocated in a track 14 and through the cooperation of a link 16 secured to the channel bracket 12, the aforesaid motion may be imparted to the housing 10. A dome-shaped reflector member 18 is axially aligned with the housing 10 and secured to the housing 10 by a plurality of studs 20. For the purposes of illustration, four such studs 20 are illustrated. A resilient gasket 22 is positioned between the upper surface of the housing 10 and the lower surface of the reflector member 18 so as to effect a seal between these members. A chamber filling plug 24 is centrally positioned and axially aligned in the reflector member 18 so as to permit the filling or withdrawal of fluid to the chamber, the chamber to be hereinafter described. A pair of electrodes 26 and 28 protrude from the reflector member 18, the electrode 26 being electrically insulated from the member 18 by a surrounding grommet 30.

In accordance with the FIGURE 1, the apparatus is set up for welding together a pair of edges. For example, the edges may be the opposing edges of a container blank so as to form a container body. A back-up member 32 is positioned under the housing 10 and a first edge 34 and a second edge 36 are shown in overlapped relationship on the back-up member 32. A plurality of nibs 38 which have been previously formed in the second edge 36 protrude from the second edge 36 and will be forced into the first edge 34 after the welding process has been completed. The nib 38' is shown in dotted outline since the area along the nib 38' has already been welded and the nib 38' no longer exists as it did previously when in the form of a nib 38. Subsequent reference to the FIGURE 3 will further illustrate this point.

With reference to the FIGURE 2, the sectional view taken along the vertical axis of the housing 10 and the member 18 affords an excellent view of the configuration of a chamber 40 formed therein. The chamber 40 commences at the lower surface of the housing 10 with its smallest diameter at a narrowed neck portion as indicated at 42 and is defined by a side wall 44 which curves upwardly and outwardly from its smallest diameter at 42 to its upper largest diameter indicated at 46 adjacent the member 18. The member 18 is formed with a concave portion 48 which closes the top of the chamber 40. The lower portion of the chamber 40 is closed by an elastomeric or resilient member or plug 50 which is larger in diameter at its upper end than its lower end so that it cannot be forced through the smallest diameter at neck 42 of the chamber 40 during the operative procedures. The elastomeric member 50 may be of rubber or one of the well-known synthetic materials which is resilient and capable of receiving energy from a fluid within the chamber 40 upon the excitation of the fluid in the chamber 40 by an electrical discharge.

The electrodes 26 and 28 are so positioned as to form a spark gap 52 therebetween. A power supply 54 has a pair of output conductors which are coupled, as shown, to the electrodes 26 and 28. The discharge of a high power spark across the gap 52 between the electrodes 26 and 28 produces a plasma bubble which is formed in the spark gap 52 and continues to grow as continued power flows into the spark gap 52 from the power supply 54. The plasma bubble produces a displacement of the fluid in the chamber 40 which forces the elastomeric plug 50, or "hammer," downwardly very rapidly so that a tip 56 of the plug 50 engages the second edge 36 along the seam to be formed. As shown, the plug 50 is approximately over the nib 38. It will be assumed that the power supply 54 is of sufficient capacity that the plug 50 may be actuated at a frequency effective to weld the second edge 36 to the first edge 34. As viewed in the FIGURE 2, the energy created between the spark gap 52 will be transferred through the fluid in the chamber 40 and will act upon the plug 50 and its tip 56 so as to drive the nib 38 on the second edge 36 into the first edge 34 to accomplish a welded seam as further indicated in the FIGURE 3. The back-up member 32 acts as an anvil to permit the welding operation.

The FIGURE 3 further illustrates the welding process wherein the nib 38' of the second edge 36 has been forced into the first edge 34 so that microscopically, a boundary between the material of the nib 38' and the first edge 34 no longer exists. The tip 56 of the elastomeric plug 50, subjected to the continuation of the single pulse producing the initial contact between the tip 56 and the second edge 36, forces the second edge 36 into engagement with the first edge 34 and, at the position shown in the FIGURE 3, the nib 38 is about to be driven into the first edge 34. The nibs 38 are formed along an edge to be joined to facilitate and make more effective the cold welding process when practiced with thin metal members such as the edges 34 and 36 illustrated in the figures. The nibs 38 may be eliminated and a flanged edge substituted therefor as shown in FIGURE 6.

The apparatus illustrated in FIGURES 1–3 and having a substantially pointed elastomeric member is best suited for the operation described heretofore.

Figure 5:
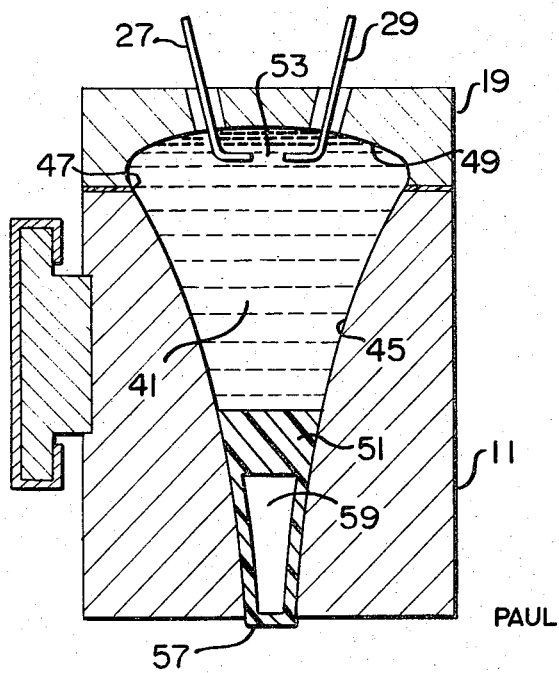
FIGURE 5 is a sectional view of the apparatus similar to FIGURE 2, but showing the elastomeric member having an internal chamber.

A modification of that apparatus, shown in FIGURES 4 and 5, providing for a plurality of pairs of electrodes protruding into an horizontally elongated chamber carrying an horizontally elongated elastomeric member, may be required to best accomplish the operations illustrated in FIGURES 6–8 and described hereafter, although a single pair of electrodes may still be sufficient depending upon the the seam length, type of material, etc.

Referring now to FIGURE 4, there is shown a housing 11 having a rectangular configuration. A substantially rectangular reflector member 19 is tightly secured to the top of the housing 11 by securing means not shown here, but illustrated in FIGURES 1 and 2 in reference to securing the member 18 to the housing 10. Electrodes 27 and 29 are arranged in a plurality of pairs secured in the reflector member 19 in the manner shown in FIGURE 2 for securing the electrodes 26 and 28 in the reflector member 18. The electrodes 27 and 29 protrude from the member 19 into a chamber 41 formed in the housing 11. Each pair of electrodes 27 and 29 is positioned to form a spark gap 53 between said electrodes. The chamber 41 commences at the lower surface of the housing 11 with its smallest cross-section as indicated at 43 and is defined by a side wall 45 which curves upwardly and outwardly from the smallest cross-section of the chamber 41 at 43 to the largest cross-section thereof at 47 adjacent the reflector member 19.

The reflector member 19 is formed with a concave portion 49 which closes the top of the chamber 41. The chamber 41 is filled with fluid wherein the tips of the electrodes 27 and 29 are immersed. The lower portion of the chamber 41 is closed by an elastomeric member 51 which is larger in cross-section at its upper portion than at its lower portion so as not to be forced out of the chamber 41 during operation. A tip or end 57 of the member 51 is adapted to protrude from the housing 11.

The operation of the apparatus shown in FIGURE 4 is similar to that of the apparatus illustarted in FIGURES 1–3, except that the apparatus of FIGURE 4 has a capability to have a plurality of spark discharges produced due to the plurality of electrode pairs.

For specific applications to narrow sections, as shown in FIGURE 7, the bottom of the elastomeric member might have to be thin, or the member might have to contain a fluid-filled chamber near its operating end. Such fluid-filled chamber is shown at 59 in FIGURE 5. The construction of the elastomeric member of FIGURE 5 may be necessary to achieve proper detail in embossing operations which cannot be obtained when a thick-ended elastomeric member of FIGURE 4 is used.

The fluid-filled internal chamber 59 provides a thin operating tip of the elastomeric member while maintaining a sufficient contact between the member and the walls of the chamber 41 to prevent a blowout of said member from the chamber 41 when the apparatus is placed in operation.

With reference to the FIGURE 6, the second edge 36' has been formed with a flange 58 so that as the tip 57 of the elastomeric plug 51 is driven along the second edge 36', the flange 58 is forced into the first edge 34 through the cooperation of the back-up member 32 to effectively weld the first edge 34 to the second edge 36'. It will be readily evident to those skilled in the art that other and different configurations than the nibs 38 and the flange 58 may be provided to facilitate the cold welding process.

In the FIGURE 7, a channel-shaped die 60 is illustrated which is one of many forms of dies useful for accomplishing a particular metal forming process. The channel-shaped die 60 will be understood to be illustrative of any one of a number of dies which may be employed in the practice of the invention. A section of material 62 positioned over the channel-shaped die 60 may be formed, the tip 57 being actuated by electrical energy being supplied across the spark gap 53 of the electrodes 27 and 29, and will produce a channel 64 in the material 62 according to the dictates of the channel-shaped die 60.

Whereas earlier figures illustrated the welding capabilities of the invention, the FIGURE 7 illustrates the metal forming capabilities of the invention. Subsequent reference will be had to FIGURE 8 illustrating the metal shearing or severing capabilities of the invention.

With reference now to the FIGURE 8, a severing die 66 having a shearing edge 68, is positioned under a section of material 70 and as the tip 57 of the plug 51 is actuated, the material 70 will be sheared by the shearing edge 68, as shown. It is not necessary that the shearing edge 68 be straight and various circular, arcuate or curved dies may be employed as found desirable or expedient.

Thus, there has been described an electrohydraulic apparatus which is suitable for rapid and efficient welding, embossing, severing, forming, etc. operations on metal sheets or sheets of plastic, paper, etc: The apparatus comprises a housing having an opening formed therein which is circular or rectangular in horizontal cross-section and defined by side walls which curve upwardly and outwardly from its smallest cross-section wherein an elastomeric member is positioned, to its upper cross-section which is enclosed by a reflector of the same configuration as the respective housing. The resilient or elastomeric member is adapted to protrude from the lower and smallest opening of the chamber so that it may engage a work piece positioned above a backup member therebelow. The reflector positioned over the largest diameter of the opening, supports one or more pairs of electrodes so as to form a spark gap between the individual electrodes of each pair. The opening or chamber may be filled with a suitable fluid such as water, oil, etc. Upon the application of suitable electrical energy to the electrodes, the discharge of a high power spark across the gap results, which produces a plasma bubble in the spark gap and, as the plasma bubble continues to grow as continued power flows into the spark gap from the power supply, the electrical energy created thereby is transferred to the fluid in the chamber and causes a displacement thereof. This displacement of the fluid in the chamber by the bubble forces the elastomeric member downwardly very rapidly against the material upon which work is to be performed, the position of the work being retained by a stationary back-up member. The work to be performed will depend upon the configuration of the die and typical examples are cold welding, embossing, severing, beading, channelling, etc. Precise amount of power can be supplied to the spark gap by the power supply. Sufficient electrical storage is available in the power supply so that a plurality of discharges may be caused to occur in rapid succession if such is found desirable or expedient.

Although chambers have been shown and illustrated which are circular or rectangular in horizontal cross-section and defined by side walls which curve upwardly and outwardly from its smallest to its largest cross-section, it will be readily evident to those skilled in the art that chambers having other configurations may be found to be more efficient in the transformation of electrical energy into mechanical work.

Thus, the present invention may be embodied in other specific forms without departing from the spirit and the essential characteristics of the invention. The present embodiments are, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Electrohydraulic apparatus comprising a chamber opening through a narrowed neck portion, at least a pair of electrodes positioned in said chamber, and an elastomeric plug member disposed within said narrowed neck portion, said plug member having an elongate cross-sectional configuration extending longitudinally along the axis of said neck portion, and adapted to protrude externally therefrom, said elastomeric member being excited by spark discharges between each pair of electrodes.

2. Electrohydraulic apparatus as defined in claim 1 including electrical supply means coupled to said pairs of electrodes.

3. Electrohydraulic apparatus as defined in claim 1 including a fluid disposed in said chamber, said fluid surrounding said pairs of electrodes and in contact with a surface of said elastomeric member.

4. Electrohydraulic apparatus as defined in claim 1 wherein said chamber includes an upper member and a lower member, said lower member being defined by side walls which curve upwardly and outwardly from its smallest cross-section in engagement with said elastomeric member to its largest cross-section adjacent said upper member.

5. Electrohydraulic apparatus as defined in claim 4 wherein said upper member and said lower member are of substantially cylindrical configuration, said upper member being adapted to support a pair of electrodes.

6. Electrohydraulic apparatus comprising a housing, an opening formed through said housing defined by side walls which curve upwardly and outwardly from its smallest cross-section to its largest cross-section, a resilient member positioned partially in said opening and in the area of its smallest cross-section, said resilient member being adapted to protrude externally from said housing, a reflector member positioned over the largest cross-section of said opening so as to convert said opening into a closed chamber, and electrical discharge means communicating with said chamber for actuating said resilient member upon the discharge thereof.

7. Electrohydraulic apparatus as defined in claim 6 wherein said resilient member is a rubber plug responsive to discharges and excited by said electrical discharge means.

8. Electrohydraulic apparatus as defined in claim 6 wherein said chamber is filled with water.

9. Electrohydraulic apparatus as defined in claim 6 wherein said electrical discharge means includes at least a pair of electrodes projecting into said chamber and supported by said reflector member, and a power supply coupled to said electrodes.

10. Electrohydraulic apparatus as defined in claim 6 including a backing member for receiving a pair of edges to be joined and means for producing relative motion between said electrohydraulic apparatus and said backing member whereby discharges by said electrical discharge means will cause said resilient member to engage and thereby weld, a pair of edges to be joined.

11. Electrohydraulic apparatus as defined in claim 6 including a forming die for receiving a section of material to be formed, and means for producing relative motion between said electrohydraulic apparatus and said forming die whereby discharges of said electrical discharge means will cause said resilient member to engage and thereby form, a section of material in accordance with said forming die.

12. Electrohydraulic apparatus as defined in claim 6 including a shearing edge die for receiving a section of material to be separated, and means for producing relative motion between said electrohydraulic apparatus and said shearing edge die whereby discharges of said electrical discharge means will cause said resilient member to engage and thereby shear, a section of material in accordance with said shearing edge die.

13. A method of transforming electrical energy to work comprising the steps of providing a chamber tapered to an opening thereof, providing an elastomeric plug member closing the opening, producing an electrical discharge within the chamber, transmitting the force produced by the discharge via a fluid within the chamber against an innermost portion of the plug member, transmitting the force via the plug member along the remainder of the tapered chamber portion to effect extension of the plug member away from the chamber and restrictively maintaining the plug member within the tapered portion of the chamber during the steps of discharge production and force transmittal.

14. A method as defined in claim 13 including the step of advancing a pair of edges to be joined over a backing member and under the actuated elastomeric plug to thereby weld the pair of edges of the chamber in contact with the walls thereof. Upon the occurrence of an electrical discharge a force is transmitted to the plug via the chamber fluid to effect outward extension of the plug into contact with a workpiece.

15. A method as defined in claim 13 including the step of advancing a section of material over a forming die and under the actuated elastomeric plug to thereby form the material in accordance with the die.

16. A method as defined in claim 13 including the step of advancing a section of material over a shearing die and under the actuated elastomeric plug to thereby sever the material in accordance with the shearing die.

References Cited

UNITED STATES PATENTS

| | | | |
|---|---|---|---|
| 3,222,902 | 12/1965 | Brejcha et al. | 72—56 |
| 3,225,578 | 12/1965 | Krieger | 72—56 |
| 3,232,085 | 2/1966 | Inoue | 72—56 |
| 3,267,780 | 8/1966 | Roth | 83—7 |
| 3,325,075 | 6/1967 | Higuchi et al. | 228—3 |

RICHARD J. HERBST, *Primary Examiner.*

U.S. Cl. X.R.

72—63

PO-1050
(5/69)

UNITED STATES PATENT OFFICE
CERTIFICATE OF CORRECTION

Patent No. 3,420,079            Dated January 7, 1969

Inventor(s) PAUL M. ERLANDSON

It is certified that error appears in the above-identified patent and that said Letters Patent are hereby corrected as shown below:

Col. 7, cancel "of the chamber in contact with the walls thereof. Upon the occurrence of an electrical discharge a force is transmitted to the plug via the chamber fluid to effect outward extension of the plug into contact with a workpiece" in lines 20 through 24.

SIGNED AND
SEALED

OCT 21 1969

(SEAL)
Attest:

Edward M. Fletcher, Jr.
Attesting Officer

WILLIAM E. SCHUYLER, JR.
Commissioner of Patents